(12) United States Patent
Bavoux et al.

(10) Patent No.: US 8,047,067 B2
(45) Date of Patent: Nov. 1, 2011

(54) SENSOR STRUCTURE IN PARTICULAR FOR A HARSH ENVIRONMENT IN A MOTOR VEHICLE AND PREHEATER PLUG COMPRISING SUCH A SENSOR

(75) Inventors: Bernard Bavoux, Bures sur Yvette (FR); Jean-Sébastien Danel, Echirolles (FR); Philippe Robert, Grenoble (FR); Maxime Pauly, Bertrange (FR)

(73) Assignees: Peugeot Citroen Automobiles SA. (FR); Commissariat a l'Energie Atomique (FR)

( * ) Notice: Subject to any disclaimer, the term of this patent is extended or adjusted under 35 U.S.C. 154(b) by 476 days.

(21) Appl. No.: 12/065,803

(22) PCT Filed: Sep. 4, 2006

(86) PCT No.: PCT/EP2006/065977
§ 371 (c)(1),
(2), (4) Date: Jun. 20, 2008

(87) PCT Pub. No.: WO2007/028782
PCT Pub. Date: Mar. 15, 2007

(65) Prior Publication Data
US 2008/0245144 A1    Oct. 9, 2008

(30) Foreign Application Priority Data
Sep. 9, 2005  (FR) ..................................... 05 09173

(51) Int. Cl.
*G01M 15/08* (2006.01)

(52) U.S. Cl. .................................. 73/118.01; 73/114.18
(58) Field of Classification Search ............... 73/114.16, 73/114.18, 114.19, 118.01
See application file for complete search history.

(56) References Cited

U.S. PATENT DOCUMENTS

| 5,597,534 | A | 1/1997 | Kaiser | |
| 6,579,498 | B1 | 6/2003 | Eglise | |
| 7,343,804 | B2 * | 3/2008 | Liu et al. | 73/649 |
| 7,353,711 | B2 * | 4/2008 | O'Dowd et al. | 73/718 |
| 7,726,269 | B2 * | 6/2010 | Ramond et al. | 123/143 R |
| 2002/0134150 | A1 * | 9/2002 | Shih | 73/146.2 |
| 2007/0229240 | A1 * | 10/2007 | Yasuda | 340/442 |
| 2009/0038386 | A1 * | 2/2009 | Bavoux et al. | 73/114.18 |

FOREIGN PATENT DOCUMENTS

DE    199 03 049    8/2000
WO    WO 97/09567    3/1997

* cited by examiner

*Primary Examiner* — Freddie Kirkland, III
(74) *Attorney, Agent, or Firm* — Lowe Hauptman Ham & Berner, LLP (57) ABSTRACT

A sensor structure notably for a harsh environment in a motor vehicle is disclosed. The sensor structure has a sensor body (1) having at one end an element (2) sensitive to the quantity to be measured in the harsh environment and at another end a connection circuit (3) for the latter, placed away from the harsh environment, and physically separated from one another. The sensor structure is connected by means for transmitting information by carrier current on an electrical conductor (5) of the sensor with which the sensitive element and the connection circuit are associated by wireless coupling means and between which are provided means (4) for protecting the connection circuit from the environment.

16 Claims, 6 Drawing Sheets

SENSOR STRUCTURE IN PARTICULAR FOR A HARSH ENVIRONMENT IN A MOTOR VEHICLE AND PREHEATER PLUG COMPRISING SUCH A SENSOR

CROSS-REFERENCE TO RELATED APPLICATIONS

The present Application is based on International Application No. PCT/EP2006/065977, filed on Sep. 4, 2006, which in turn corresponds to French Application No. 05 09173, filed on Sep. 9, 2005, and priority is hereby claimed under 35 USC §119 based on these applications. Each of these applications are hereby incorporated by reference in their entirety into the present application.

FIELD OF THE INVENTION

The present invention relates to a sensor structure notably for a harsh environment in a motor vehicle and a preheater sparkplug comprising such a structure.

BACKGROUND OF THE INVENTION

A main problem encountered in applications of this type is the ability to implement measurements in a harsh environment, for which the conventional sensor technologies are not usable because of the harsh environmental conditions encountered, whether these environmental conditions be thermal, vibratory, chemical, etc.

An approach used hitherto to carry out such a measurement in a difficult environment such as this is to place a transducer between the quantity to be measured and the measuring device, in such a way that at the end of the transducer the environmental conditions are compatible with the technology of the sensor.

The role of the transducer is thus to form a screen for certain physical components that are troublesome or incompatible with the sensor, while being a transmitter of the quantity to be measured.

But the use of this transducer presents a certain number of drawbacks, notably because of deformations, loss or addition of information to which the transducer may give rise, etc.

These impairments are characterized for example by imperfections in amplitude (lack of precision or saturation) and/or in the dynamic sector (limited bandwidth at low and/or at high frequency).

An example of such a measurement in a harsh environment relates to the measurement of the cylinder pressure in a motor vehicle engine.

The measurement of such a cylinder pressure in an engine is a new requirement. This involves measuring during the various cycles of the engine (intake, compression, combustion, exhaust), the variation in gas pressure so as to optimize control of injection and ignition to obtain better efficiency and thus to decrease pollution.

But, during the engine cycles, the temperature varies from ambient temperature when the engine is off, to several hundred degrees C, knowing that the flame in the cylinder is at about 1800° C. Now, a certain number of materials used for sensors do not withstand such temperatures. Such is for example the case with materials such as silicon, which are customarily used for such pressure measurements.

It has thus been proposed to include the cylinder pressure sensor in a preheater sparkplug, for example for diesel engines. The tip of the sparkplug is then situated in the top of the cylinder in contact with the flame. It is used as transducer to compress at the other end of the sparkplug a sensor which is situated in a temperate environment in contact with the engine cylinder-head cooled by water circulation for example.

But the transduction performed by the tip of the preheater sparkplug is subject to mechanical inertia (mass of the transducer) and, according to the devices used, poses leaktightness problems, and also problems of precision in the low pressure values and/or is sensitive to vibrations.

A variant embodiment of this assembly also consists in including the cylinder pressure sensor in the preheater sparkplug, but differs from the previous solution in that the fixing device gives support to the pressure transducer on either side of the thickness of the cylinder-head. A deflection of the cylinder-head under the effect of the pressure is then measured.

But this measurement depends on the torque under which the preheater sparkplug is tightened in the cylinder-head. Moreover, it picks up the modes of vibration of the cylinder-head which are superimposed on the useful signal. Finally, the measured signal is affected by the transfer function which depends on the cylinder-head and its environment.

Another solution consists in using one or more optical fibres to pick up the reflection of a light ray by a membrane subjected to pressure and temperature.

The optical fibre then transports this information to a temperate place where signal acquisition and processing electronics are located.

However, the optical fibre also has temperature withstand limits. The membrane on which the light ray is reflected determines the quality of the measurement. Its definition must take account of the mechanical (natural mode of vibration) and thermal (expansion deforming the membrane) characteristics, problems of mechanical aging of the membrane, problems of oxidation on its reflecting face, etc.

Moreover, telecommunication technologies that make it possible to communicate data and/or to remotely power associated electronic devices are now emerging.

Thus for example, such means are used for tire pressure measurement.

Indeed it is difficult to run electrical links in a rotating part. A pressure sensor tied to the tire then experiences difficulties in communicating with the vehicle because of its displacements with respect to the latter.

A solution consists in including a self-powered sensor inside the tire and an emitter/receiver in the vehicle. The sensor can then communicate by a radiofrequency link with the emitter/receiver. In certain devices, the sensor can also be remotely powered by induction or by radiofrequency.

Such a structure can also be used to ensure temperature measurement in an oven.

Specifically, it is difficult to run electrical links in too hot an environment, the leads implementing for example solder joints, being sensitive to this type of environment, insofar as for example such solder joints may melt.

Radiofrequency communication means are also used in the automobile industry sector for vehicle antitheft facilities.

Thus for example, an identification device can be integrated into a motor vehicle key, this device not requiring any power supply in order to reduce maintenance to the minimum.

It is then possible to include in the key a device which in response to a radiofrequency signal returns a carrier signal bearing specific information according to the key. This device is then powered by virtue of the energy of the electromagnetic signal received.

SUMMARY OF THE INVENTION

Other examples using radiofrequency communication means for radiofrequency identification of RFID type implement passive or active chips combining energy pick-up, processor, memory and radiofrequency communication and are developing on a large scale for identifications.

The aim of the invention is to propose a sensor structure well suited to use in a harsh motor vehicle environment.

For this purpose the subject of the invention is a sensor structure notably for a harsh environment in a motor vehicle, characterized in that it comprises a sensor body comprising at one end an element sensitive to the quantity to be measured in the harsh environment and at another end a connection circuit for the latter, placed away from the harsh environment, physically separated from one another, connected by means for transmitting information by carrier current on an electrical conductor of the sensor with which the sensitive element and the connection circuit are associated by wireless coupling means and between which are provided means for protecting the connection circuit from the environment.

According to other characteristics of the invention:
the means for transmitting information furthermore comprise remote power supply means of the sensitive element that are integrated into the connection circuit;
the sensitive element comprises an oscillating circuit, at least one component of which is sensitive to the quantity to be measured;
the oscillating circuit furthermore comprises a coil forming inductance of the oscillating circuit and means for coupling the sensitive element to the electrical conductor;
the conductor is associated with any other function localized in the sensor body such as for example a winding for a preheating function in a preheater sparkplug;
it comprises means for magnetic coupling of the winding of the conductor and of the coil of the sensitive element;
the winding and the coil are disposed perpendicularly one with respect to the other;
the winding and the coil are disposed coaxially;
the sensitive element is an element sensitive to pressure;
the sensitive element is an element sensitive to temperature;
the sensitive element is an element sensitive to gas;
the sensitive element is an element sensitive to vibrations, accelerations or impacts;
the sensitive element is an element sensitive to two or more quantities out of temperature, pressure, gas, vibration, acceleration or impact, etc.;
the component of the oscillating circuit sensitive to the quantity is a capacitor in series with the latter's coil; and
the coil is a spiral coil and the winding a helical winding.

The subject of the invention is also a preheater sparkplug for a motor vehicle diesel engine, characterized in that it comprises a sensor structure such as described above.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE DRAWINGS

Figure 1:
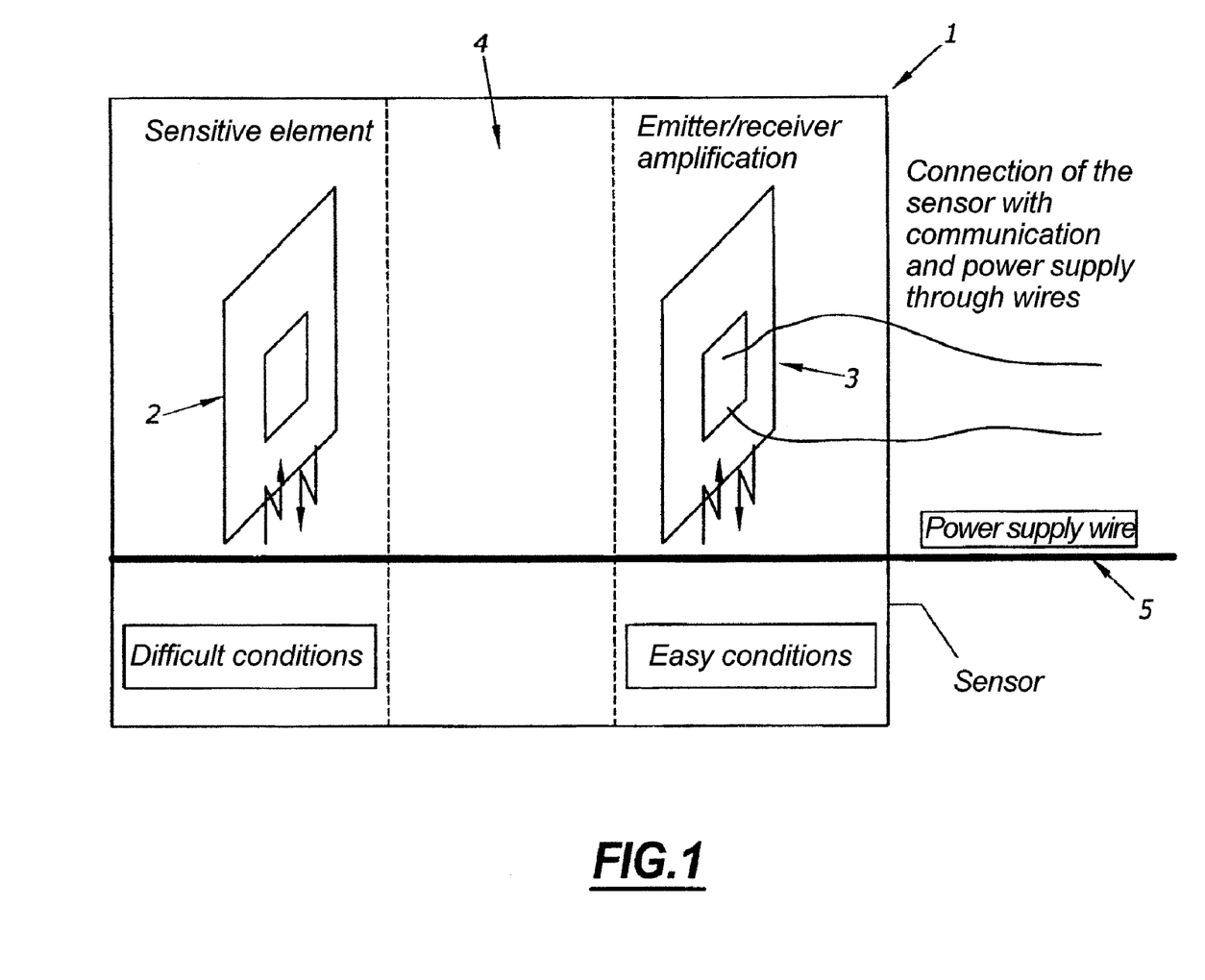
FIG. 1 represents a schematic diagram illustrating the general structure and the operation of a sensor structure according to the invention.

In FIG. 1 is illustrated a sensor structure notably for a harsh environment in a motor vehicle.

It is known that in a schematic manner, this sensor structure comprises a sensor body denoted by the general reference 1 in this figure, comprising at one end an element sensitive to the quantity to be measured, this sensitive element being denoted by the general reference 2.

This sensitive element is then placed in the harsh environment.

At the other end, this sensor body comprises a connection circuit denoted by the general reference 3, placed away from the harsh environment and separated physically from the sensitive element. On the other hand, this circuit 3 is connected to the sensitive element 2 by means for transmitting information by carrier current on an electrical conductor of the sensor with which the sensitive element and the connection circuit are associated by wireless coupling means.

Specifically, this circuit can for example comprise an information emitter/receiver or indeed amplification means, making it possible to recover a signal of the sensitive element, or indeed to power the latter, through a conductor of the sensor.

In this case, the means for emitting/receiving information, or indeed for remote powering that is to say for receiving power at a distance, are integrated into the sensitive element 2 for example in the form of a monobloc chip with no lead with an electrical conductor.

Between this connection circuit 3 and the sensitive element 2 are disposed means denoted by the general reference 4, intended to ensure protection of the connection circuit from the harsh environment.

Thus for example, thermal insulation means can be envisaged between the sensitive element 2 and the circuit 3, that is to say between the two ends of the sensor body 1, to ensure protection of the circuit 3.

The electrical conductor is for its part denoted by the general reference 5 and therefore extends within the sensor between its ends.

A harsh environment is in fact an environment in which, in addition to the quantity to be measured, another quantity is aggregated that is incompatible with an electronic measurement system comprising at least one electronic component with leads.

In such an environment, the electronics and its leads customarily constitute a weak point. A lead is in fact a wire or a pad making contact between two parts.

A metallization layer of a printed circuit is not considered to be a lead. A metallization layer of an integrated circuit (for example a micro- or nanotechnology chip) is not considered to be a lead either.

The sensor structure according to the invention dispenses with the concept of a transducer, that is to say of an element serving to transmit the relevant information, such as for example the pressure, as far as a sensor placed in a less harsh zone, this transducer ensuring measurement, as was explained previously.

Conversely, the sensitive element is placed as far as possible in contact with the physical quantity to be measured insofar as the connection circuit can for its part be protected from the environment.

Thus, in the example described with regard to FIG. 1, the circuit which serves to connect the sensor to the outside also comprises means for emitting/receiving information by carrier current on the conductor 5, making it possible to recover from the sensitive element the value of the quantity to be measured.

Power supply means for this sensitive element can also be envisaged in a conventional manner.

As was indicated previously, this sensitive element can be an element sensitive to a pressure or to a temperature.

It is then possible to dispense with the leads between the sensitive element of the sensor and its connection circuit and replace these leads with a carrier current telecommunication device and possibly remote powering actually within the sensor. Remote powering then allows the sensitive element to receive the energy necessary for its operation.

The use of means for protecting the circuit then makes it possible to protect this circuit and to place it in a secure environment.

It will be noted that these protection means can for example consist of a layer of air or the like.

The telecommunication means used can for example be analogous to those already used in the technologies of electronic tags or RFID systems, in which the tag placed on an object emits a signal for identifying this object.

In the case of the structure of a sensor according to the invention, the signal is moreover a carrier of a measurement of the quantity.

The sensitive element 2, for example a chip based on micro- or nanotechnology constitutes a single-block material element which can be implemented without leads.

It is thus appreciated that by virtue of such a structure it is possible to solve the problems related to the melting temperature of component solder joints, and also the withstand temperatures of the links between the electronic chips and the latter's connection lugs.

Additionally, this structure also makes it possible to solve the problems related to vibrations, to impacts and to movements of the leads, to temperature withstand of the electronic devices for measurement, processing, amplification and power supply and of the leaktightness means between the harsh environment and the protected portion where the information has to be conveyed.

Figure 2:
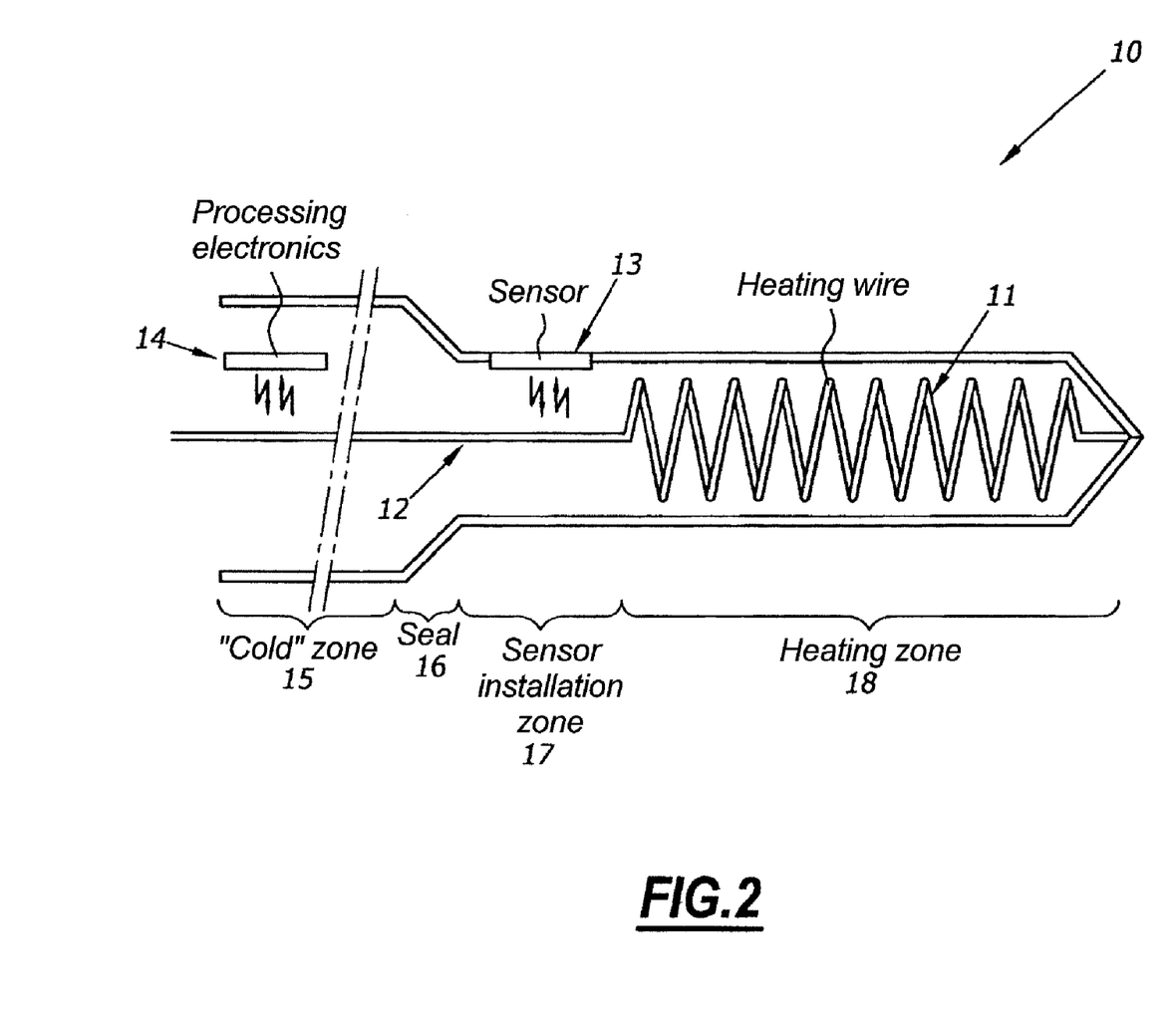
FIG. 2 represents a view in schematic section of a first exemplary embodiment of a preheater sparkplug comprising a sensor structure according to the invention.

In FIG. 2 is illustrated a first exemplary embodiment of a preheater sparkplug notably for a motor vehicle diesel engine comprising such a sensor structure.

Indeed it is known that in the automobile sector, and more particularly for diesel engines, the measurement of the combustion parameters such as pressure and temperature appears increasingly necessary in order to optimize the operation of engines so as to reduce consumption and pollution.

But the environment of the combustion chamber is very aggressive with a temperature of the order of 1000° C. and a pressure of possibly as much as 200 bar.

In this FIG. 2 is illustrated a preheater sparkplug, denoted by the general reference 10 in this figure, for a motor vehicle diesel engine and which comprises a heating wire denoted by the general reference 11, connected by an electrical conductor to power supply means (not represented), the electrical conductor being denoted by the general reference 12.

The sensitive element is denoted by the general reference 13 and the connection circuit is denoted by the general reference 14.

Thus the sensitive element placed on the pencil of the sparkplug is in direct contact with the parameters to be measured of the combustion chamber, such as for example the temperature, the pressure or the like.

This sensitive element is therefore placed in harsh conditions.

The circuit for connection with the electronic processing portion can be installed inside the sparkplug at the corresponding end of the latter, that is to say in a zone cooled by the cylinder-head of the engine. Thus, the sparkplug can be defined as four distinct zones, namely a cold zone denoted by the general reference 15, a seal zone denoted by the general reference 16, a zone denoted by the general reference 17 for installing the sensitive element and a heating zone denoted by the general reference 18.

It goes without saying of course, as will be described in greater detail subsequently, that other embodiments still may be envisaged.

The sensitive element then communicates with the processing electronics through a modulation on the power supply conductor of the preheater sparkplug heating wire.

Such a structure presents the advantage of simplifying connection while shifting the processing electronics to a zone where the temperature is lower, the pressure lower, etc.

Such a communication can be performed for example with the aid of a signal that does not disturb the operation of the sparkplug and also serves to power the sensor, this signal being transmitted by the conductor 12.

In an advantageous manner, the communication device of the sensitive element is embodied on a single chip, with no lead, so as to render it more enduring to the temperature and pressure conditions.

Figure 3:
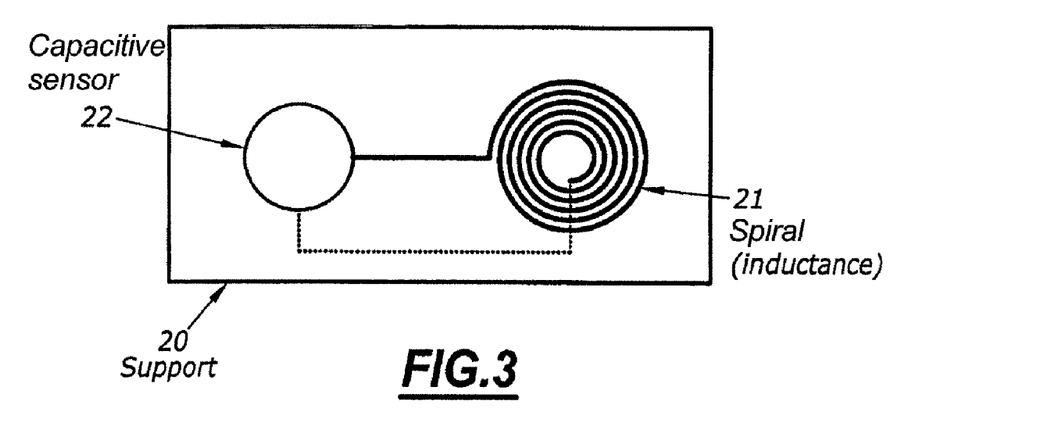
FIG. 3 represents an exemplary embodiment of a sensitive element entering the construction of a sensor structure according to the invention.

An embodiment of these means is illustrated in FIG. 3.

The sensitive element then comprises a support denoted by the general reference 20 on which are provided in series a spiral coil forming inductance denoted by the general reference 21, in series with a capacitive pressure sensor denoted by the general reference 22.

The sensitive portion of the sensor is then a capacitive pressure sensor connected to a for example spiral-shaped micromachined coil. The association of these two elements in series constitutes a network oscillating at a frequency dependent on capacitance and therefore on pressure.

The coil used makes it possible to embody at one and the same time an inductance for the oscillating circuit and a system for coupling with the conductor 12 of the heating wire.

All these elements are embodied on a single chip by conventional microelectronics techniques without resorting to means involving leads.

Figure 4:
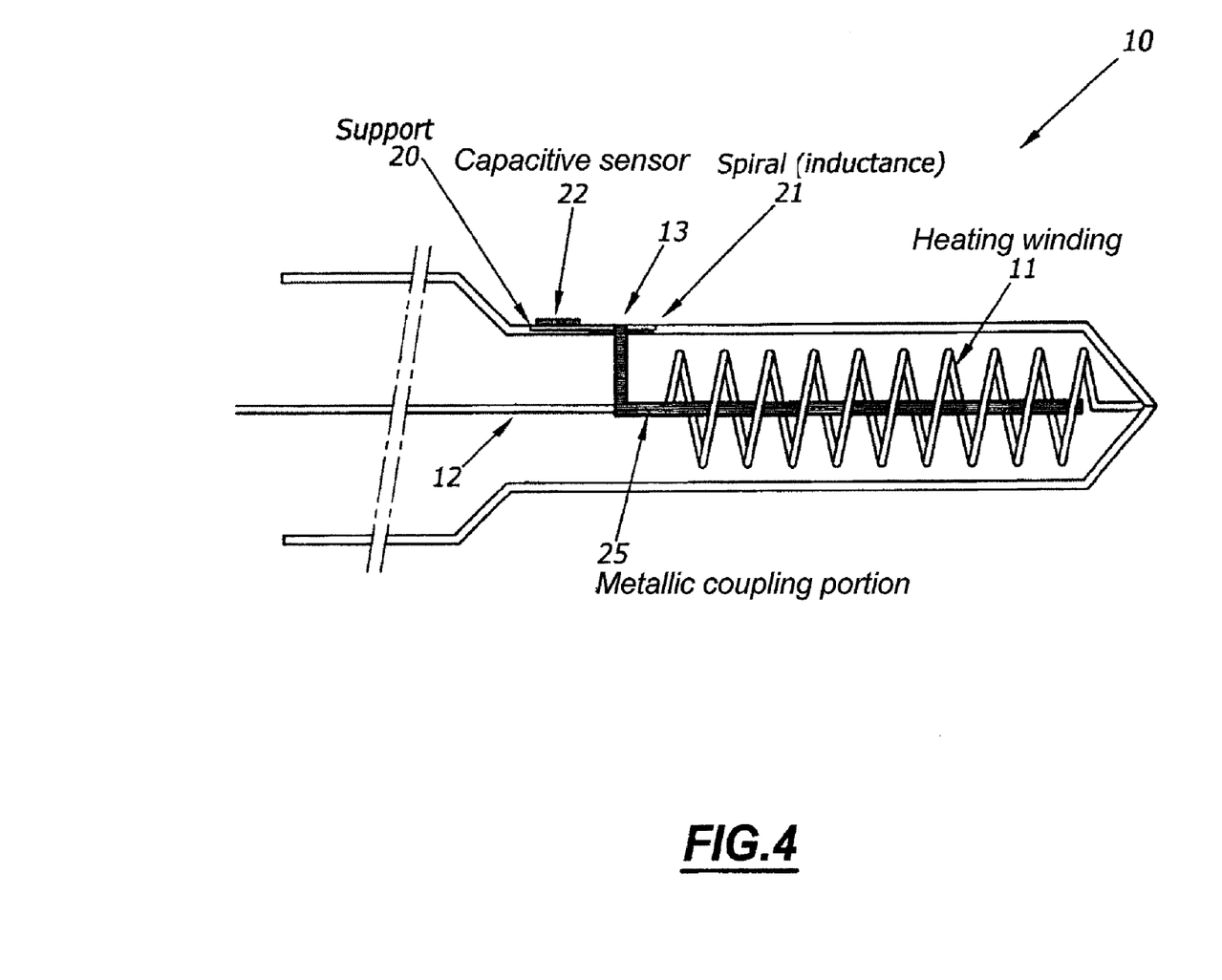
FIGS. 4, 5, 6 and 7 represent variant embodiments of a preheater sparkplug and of a sensor structure according to the invention.
Figure 5:
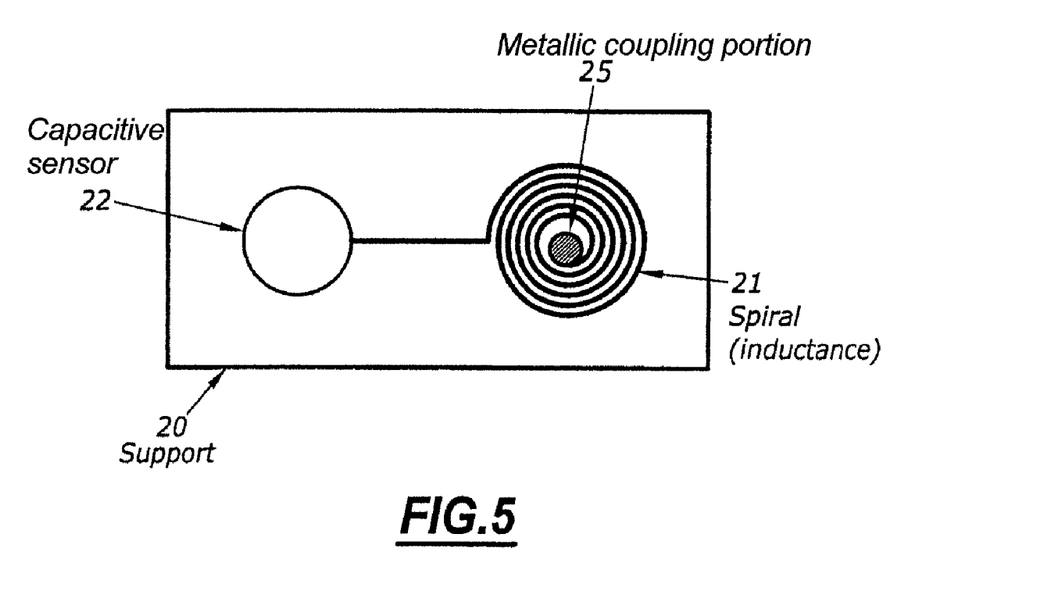

In FIGS. 4 and 5 is illustrated a variant embodiment in which use is made of means for magnetic coupling between the heating wire for the sparkplug which takes the form of a helical winding and the inductance of the sensitive element which takes the form of a spiral coil.

In these FIGS. 4 and 5, identical reference numbers have been used to denote parts analogous or identical to those described with regard to the previous figures.

Thus the preheater sparkplug 10, the heating winding 11, the power supply conductor 12, the sensor 13 with its support 20, its spiral inductance 21 and its capacitive sensor 22 are depicted in these FIGS. 4 and 5.

In these figures, a metallic part denoted by the general reference 25 and which passes through the two coils is advantageously used to magnetically couple the inductance coil of the sensitive element of the sensor and the helical winding for heating the sparkplug.

This metallic part 25 then makes it possible to channel the flux of the magnetic field in a more effective manner than the air so as to improve the magnetic coupling between the two windings.

In the exemplary embodiment described, the two windings, that is to say the heating winding and the spiral coil, are disposed perpendicularly one with respect to the other and the part 25 exhibits a bent piece.

One of the ends of this part 25 then extends through the heating winding 11 while its other end extends at the center of the spiral coil 21.

Figure 6:
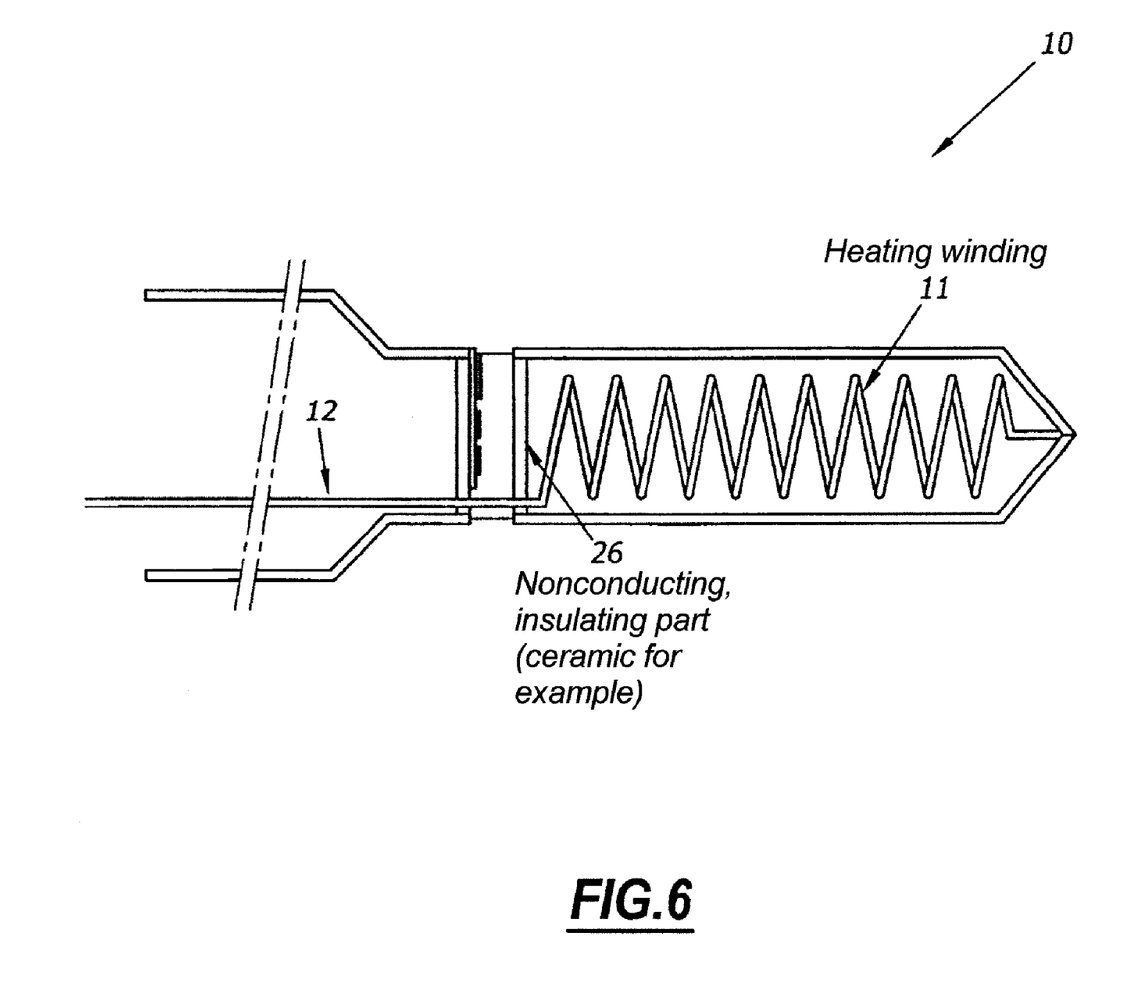
Figure 7:
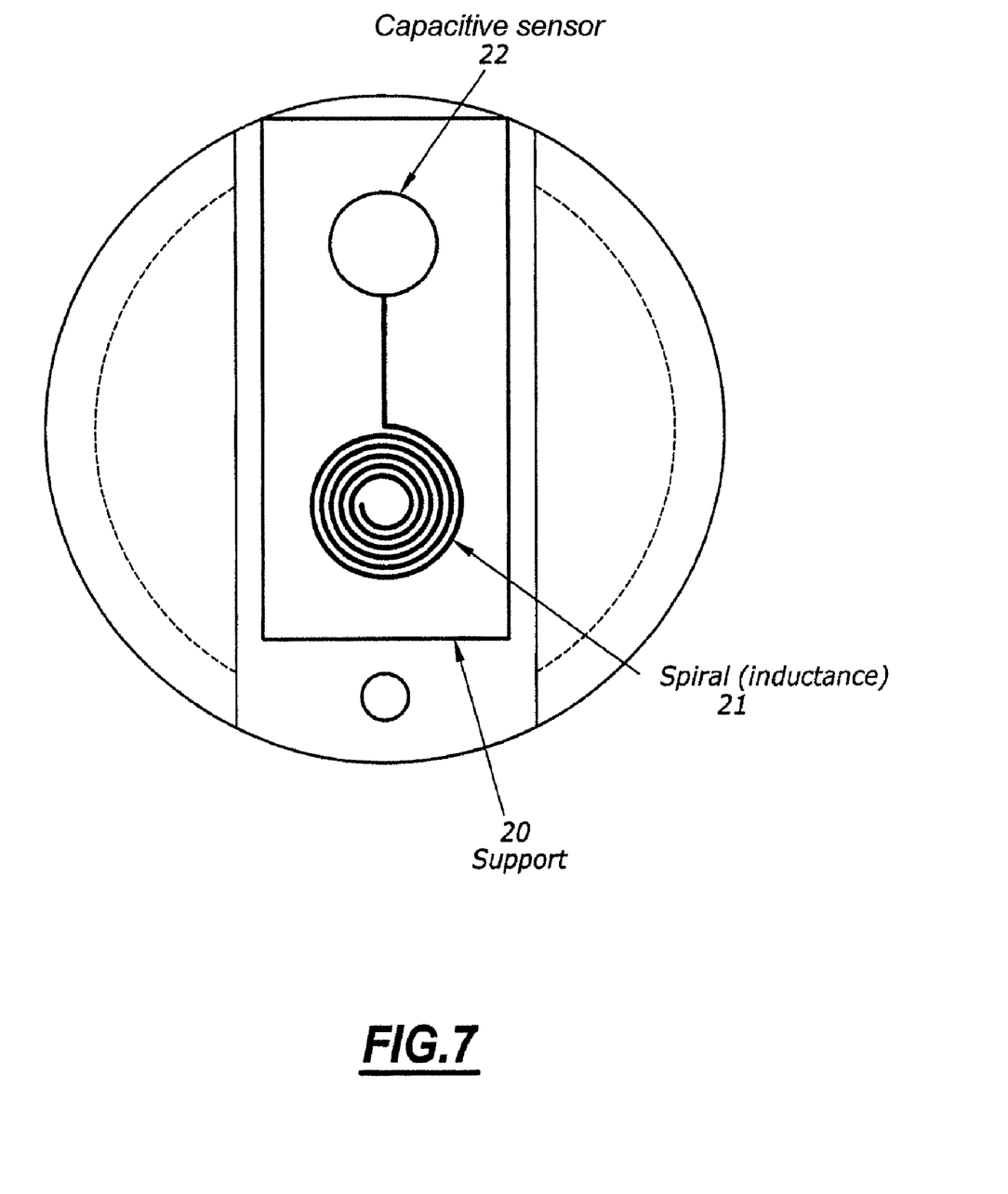

Of course, other embodiments still may be envisaged such as for example that illustrated in FIGS. 6 and 7.

In these figures, identical reference numbers denote parts identical or analogous to those already described with regard to the previous figures.

Thus for example the preheater sparkplug 10, the heating winding 11, the conductor 12, the support of the sensitive element 20 with its spiral inductance 21 and its capacitive sensor 22 are depicted in these figures.

In the example described, the spiral coil of the sensitive element and the sparkplug heating winding are disposed coaxially.

The sensitive element is then disposed transversely with respect to the axis of the sparkplug in such a manner that the helical heating inductance coil and spiral inductance coil are coaxial or, in any event, exhibit parallel axes.

In this way, the magnetic coupling between these two elements is greatly increased.

However, it is necessary to achieve isolation between the interior of the sparkplug and the gases of the combustion chamber by nonconducting parts made for example of ceramic, that are permeable to electromagnetic waves.

These parts are for example denoted by the general reference 26 in these figures.

It goes without saying of course that other embodiments still may be envisaged.

Thus for example, it is possible to group together several sensors on one and the same sensitive element such as for example a pressure sensor, a temperature sensor, etc.

This then makes it possible to reduce cost by using a mutualized telecommunication and/or remote powering device.

This also makes it possible for example to correct certain drifting of the sensitive element. Such is for example the case for a combination of pressure and temperature sensors, by a correction of the drift with temperature.

It is also possible to envisage use or combination with a sensor sensitive to a gas, to allow for example measurement of the oxygen richness inside the combustion chamber.

It is also possible to envisage use or combination with a sensor sensitive to a vibration, acceleration or impact, so as to make it possible for example to monitor the progress of the combustion.

An element sensitive to two or more quantities out of temperature, pressure, gas, vibration, acceleration or impact, can also be envisaged.

Of course, various types of radiofrequency telecommunication devices may be envisaged.

It will be readily seen by one of ordinary skill in the art that the present invention fulfils all of the objects set forth above.

After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A sensor structure for a harsh environment in a motor vehicle, comprising a sensor body having at one end an element sensitive to a quantity to be measured in the harsh environment and at another end a connection circuit for the latter, placed away from the harsh environment, physically separated from one another, connected by means for transmitting information by carrier current on an electrical conductor of the sensor, the sensitive element and the connection circuit are each coupled to the electrical conductor by wireless coupling means and between the sensitive element and the connection circuit are provided means for protecting the connection circuit from the environment, wherein
   the sensitive element comprises an oscillating circuit, at least one component of the oscillating circuit being sensitive to the quantity to be measured, and
   the oscillating circuit further comprises a coil forming an inductance of the oscillating circuit and the coil forming a means for coupling the sensitive element to the electrical conductor.

2. The structure as claimed in claim 1, wherein the means for transmitting information further comprises a remote power supply means of the sensitive element that are integrated into the connection circuit.

3. The structure as claimed in claim 1, wherein the conductor is associated with a winding.

4. The structure as claimed in claim 3, comprising means of magnetic coupling of the winding of the conductor and of the coil of the sensitive element.

5. The structure as claimed in claim 4, wherein the winding and the coil are disposed perpendicularly one with respect to the other.

6. The structure as claimed in claim 4, wherein the winding and the coil are disposed coaxially.

7. The structure as claimed in claim 3, wherein the winding and the coil are disposed perpendicularly one with respect to the other.

8. The structure as claimed in claim 3, wherein the winding and the coil are disposed coaxially.

9. The structure as claimed in claim 3, wherein the coil is a spiral coil and the winding a helical winding.

10. The structure as claimed in claim 1, wherein, the sensitive element is an element sensitive to pressure.

11. The structure as claimed in claim 1, wherein, the sensitive element is an element sensitive to temperature.

12. The structure as claimed in claim 1 wherein, the sensitive element is an element sensitive to gas.

13. The structure as claimed in claim 1, wherein the sensitive element is an element sensitive to vibrations, accelerations or impacts.

14. The structure as claimed in claim 1, wherein the sensitive element is an element sensitive to two or more quantities out of temperature, pressure, gas, vibration, acceleration or impact.

15. The structure as claimed in claim 1, wherein the component of the oscillating circuit sensitive to the quantity is a capacitor in series with the coil.

16. A preheater sparkplug for a motor vehicle diesel engine, comprising a sensor structure as claimed in claim 1.

* * * * *